Patented Aug. 27, 1946

2,406,657

UNITED STATES PATENT OFFICE 2,406,657

PLASTICIZERS

William P. Bitler, Haverstraw, and Leonard Nicholl, Nyack, N. Y., assignors to Kay-Fries Chemicals, Inc., West Haverstraw, N. Y., a corporation of New York No Drawing. Application November 19, 1942, Serial No. 466,224

5 Claims. (Cl. 260—345)

This invention relates to plasticizers and more particularly plasticizers for elastomers and methods of making the same.

An object of this invention is a plasticizer with a sufficiently low vapor pressure to prevent loss thereof from thin films of elastomers such as are used in the manufacture of waterproof fabrics.

Yet another object of this invention is the production of plasticizers having vapor pressures such as to boil at temperatures in the neighborhood of 200° C. at pressures of 1½ mm. of mercury absolute.

It is also an object of this invention to provide plasticizers having a sufficient number of oxygen containing groups to make them good solvents for elastomers of the vinyl chloride type and various butadiene types.

It is a further object of this invention to provide plasticizers of the character described which distill without decomposition, are viscous, liquid, and essentially colorless.

Another object of this invention is the provision of esterified plasticizers which are practically insoluble in water and characterized by low melting points of the order of not more than 35° to 40° C., thereby rendering them capable of being worked into elastomers at ordinary temperatures and with conventional apparatus.

Other and important objects and features of novelty of the present invention include the preparation of 3-acetoxymethylene, 3.6 endoxohexahydrophthalic anhydride and the esters thereof, and intermediates for the preparation thereof.

In our prior application Serial No. 440,266 filed April 23, 1942, we have disclosed and claimed improvements in plasticizers. In this, our prior application, we have disclosed the Diels-Alder reaction using maleic anhydride and furfuryl derivatives, together with the subsequent treatment of the resultant condensation products in the presence of an alcohol to obtain desired intermediate and end products.

We have now found that novel plasticizers and compounds particularly suitable for such use can be made according to the following teaching:

The essence of our present invention resides in the treatment or reaction of a furfuryl derivative, such as the acetate, in anhydrous ether, or other suitable solvent, with maleic anhydride, and the catalytic treatment (Pd-black) of the resultant end products, or "adducts," with hydrogen, at normal temperature and pressure, and in the presence of a non-reactive solvent, such as acetone, to produce a "reduced adduct," and in substantially stoichiometrical quantities, and without the presence of addition or degradation products. The invention or novel process further provides for the treatment of our "reduced adduct" with butanol, or other esterifying agents, to secure the desired ester product suitable for use as a plasticizer.

In the practice of the invention a furfuryl derivative such as furfuryl acetate may be made according to the following equation:

I

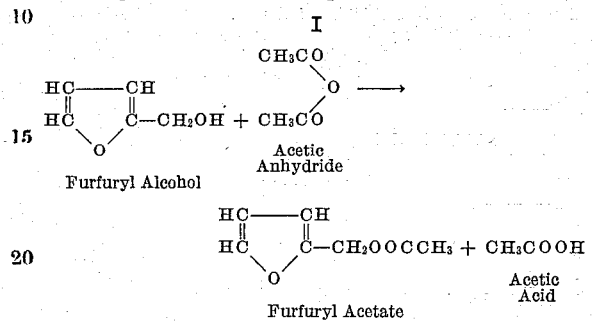

Furfuryl Alcohol + Acetic Anhydride → Furfuryl Acetate + Acetic Acid

Thereafter this product is reacted with maleic anhydride to give a novel condensation product or intermediate, called "adduct" for purposes of convenience, and which corresponds to 3-acetoxymethylene, 3.6 endoxotetrahydrophthalic anhydride, all according to the following equation:

II

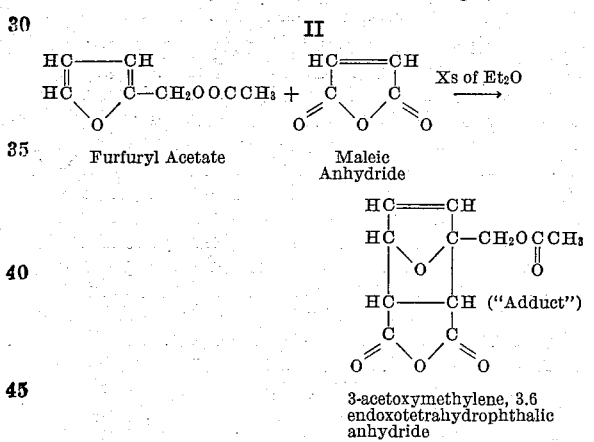

Furfuryl Acetate + Maleic Anhydride → 3-acetoxymethylene, 3.6 endoxotetrahydrophthalic anhydride ("Adduct")

The "adduct," prepared according to the above equation, is then reduced with hydrogen in the presence of a palladized carbon catalyst, at normal temperature and pressure, and desirably in 5% or more acetone solution. At this point it is to be noted that a feature of novelty of the invention which has been found critical is that the hydrogen reduction must be carried out in a non-reactive solution. The equation for reduction is as follows:

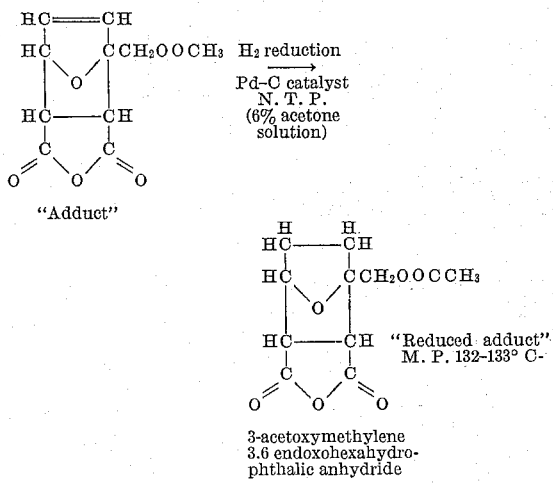

The product of this reduction, and called "reduced adduct," is 3-acetoxymethylene, 3.6 endoxohexahydrophthalic anhydride.

The "reduced adduct" may be esterified as by treatment with butanol in the presence of sulphuric acid as a catalyst, all as indicated in the following equation:

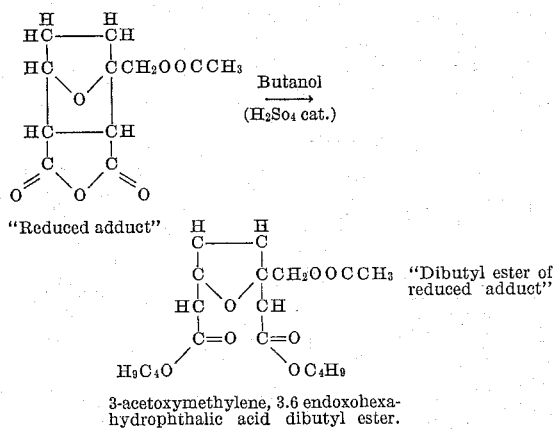

The final ester product is 3-acetoxymethylene, 3.6 endoxohexahydrophthalic acid dibutyl ester.

In the research work leading up to the present discovery, it was found that in carrying out the Diels-Alder reaction, and heating in methanol to help dissolve the "adduct" formed in the subsequent hydrogenation reaction, it was impossible to recrystallize the adduct out of its methanol solution. This indicated that at least partial esterification occurred, and that new compounds were formed, or that decomposition was taking place, or both. In testing out this postulate, the reaction was carried out to secure the half methyl ester, and it was found that low yields of the reduced half methyl ester were obtained when the "adducts" or intermediate products were heated slightly in methanol. In addition to the half methyl ester, small amounts of the neutral methyl ester were obtained. In continuing the research, it was found that the reduced half methyl ester had the same melting point as was claimed for the "reduced adduct." Upon considering this effect of reactive solvents, such as methanol, non-reactive solvents were tried out, and acetone was found suitable.

In the use of acetone, it is found that the intermediate product or adduct is very soluble in acetone and that a solution can be reduced by hydrogen in acetone solution in the presence of palladized carbon, as a catalyst. This reaction may desirably be carried out with 5% and up of "adduct," with 4% to 6% of the palladized carbon catalyst, based on the weight of the "adduct" present. In this reaction, it will be seen that the "adduct" cannot esterify, because of the lack of alcohol, and, therefore, the end product should be the pure "reduced adduct." This was found to be true, as reduction takes place very smoothly and stoichiometrically at normal temperatures and pressure. The catalyst may be filtered off from the reaction mixture, and can be returned to the process without requiring reactivation. Upon distillation off of the acetone, a substantially quantitative yield of "reduced adduct" is obtained. It is noted that the unesterified "reduced adduct" of the present invention, obtained by reduction, in the presence of acetone, has a melting point of 132–133° C. By acidity determinations and ester determinations we have established the fact that the "reduced adduct" of Equation III was the compound which we obtained. The half ester of the "adduct," when purified and crystallized, has a melting point of 141–142° C., and agrees exactly with the value Diels gives for the melting point of his "reduced adduct." This 141–142° C. melting point of the partially esterified adduct is 10° higher than that of our unesterified, reduced adduct, which fact permits clear identification of the different products.

The "reduced adduct," on esterification with butanol, methanol and ethanol, gave esters having the following properties:

The "dibutyl ester of the reduced adduct," distills without decomposition, is viscous, liquid, colorless, and practically insoluble in water. This compound has a melting point of about 35–40° C. and a boiling point of 204–207° C. at 1½ mm. absolute pressure. This is contrasted with the melting points of the dimethyl ester (122.5–123° C.) and the ethyl half ester (152–152.5° C.), and which are very soluble in water.

In carrying out the reactions of the present invention the following details are noted:

Equation I.—400 grams of furfuryl alcohol were added to 500 grams of acetic anhydride, at the refluxing point of the anhydride, and over a twenty minute period. After the reaction had taken place, an excess of ice-cold water was added in one lot. An oily layer separated out from the water layer, and was washed with 5% solution of sodium carbonate until slightly alkaline to litmus. This oil (furfuryl acetate) distilled off at a boiling point of 75–77° C. over a fifteen minute distillation period, and the yield was 431 grams, which is 76% of theory.

In the Diels-Alder reaction of Equation II, 13.1 grams of furfuryl acetate were reacted with 10 grams of maleic anhydride in 150–200 grams of absolute ether, and at room temperature. The reaction ran for eight days and 50% of the product was reacted in about three days. After five days white needles were crystallized out and 80% to 90% of the reagents were reacted at the end of the eight day period.

At the completion of the eight day period, the needles of the reaction product or "adduct" were soaked and washed with ether. The recovered product, which is the 3-acetoxymethylene, 3.6-endoxotetrahydrophthalic anhydride, was dissolved in acetone and hydrogenated. In this reaction (Equation III), 12 grams of the "adduct" were dissolved in 200 cc. of acetone, comprising a known excess. This gave a substantially 6% acetone solution of the "adduct." To this was added one gram of palladized carbon, as a catalyst, and 1140 cc. of hydrogen were run in at normal temperature and pressure. The recovered "adduct" or "reduced adduct" was found to have a yield of 12.01 grams and a melting point of 129–130° C. After purification of the "reduced adduct," the melting point was found to be 132–133° C.

In the preparation of the dibutyl ester, the "reduced adduct" of Equation III was esterified with butanol, in the presence of sulphuric acid as a catalyst. In this reaction, 50 grams of the "reduced adduct" were dissolved in 200 grams of butanol, in the presence of ½% of sulphuric acid as a catalyst. The reaction mixture was refluxed, at the boiling point of the butanol, for five hours. 50 cc. of butanol was then flashed through the reaction vessel. After this flash treatment, the reaction mixture was washed with a 5% sodium carbonate solution to neutral reaction to litmus. The butanol was distilled off, and the product comprising the "dibutyl ester of reduced adduct" was recovered in 64% yield, and with no evidence of decomposition. In view of the small amount of product handled, it is believed that in commercial quantities, the yield would have been appreciably greater.

In considering the results of the reactions above discussed, it is to be noted that the original Diels-Alder reactions, as reported in the literature, were carried out in the presence of anhydrous ethers, or benzene. The discordant results obtained by hydrogenating in the presence of methanol, which is the standard solvent for such reactions, have been shown to be due to the reactivity of the methanol toward the anhydride grouping in the adduct. This is evidenced by the data submitted herein wherein it is shown that in the presence of a non-reactive solvent, such as acetone, discordant results are avoided, and uniform products are obtained, in maximum yield, and with concordant boiling and melting points.

The improvement in hydrogenating the Diels-Alder reaction product by carrying the same out in the presence of acetone, or other non-reactive solvents, is of high importance and has not previously been described in the literature.

What is claimed is:

1. In the reduction of Diels-Alder condensation products, also known as adducts, the improvement comprising carrying out the reduction in the presence of a non-reactive solvent.

2. Process according to claim 1 in which the non-reactive solvent is acetone.

3. Process for the preparation of 3-acetoxymethylene, 3.6 endoxohexahydrophthalic anhydride having a melting point of 129–130° C., including reducing the condensation product of furfuryl acetate and maleic anhydride with hydrogen in non-reactive solution in the presence of a palladium-carbon catalyst.

4. Process according to claim 3 in which the reduced adduct is purified and then esterified with butanol to give the dibutyl ester of the reduced adduct.

5. As a composition of matter, 3-acetoxymethylene,3.6 endoxohexahydrophthalic anhydride (M. P. 132–133° C.)

WILLIAM P. BITLER.
LEONARD NICHOLL.